United States Patent
Cimminelli et al.

[11] Patent Number: 5,996,622
[45] Date of Patent: Dec. 7, 1999

[54] FILLER PIPE UNIT FOR THE FUEL TANK OF A MOTOR VEHICLE

[75] Inventors: Francesco Cimminelli, Turin; Eugenio Siviero, Rivalta; Giulio Castagneri, Nole, all of Italy

[73] Assignee: Ergom Materie Plastiche S.p.A., Turin, Italy

[21] Appl. No.: 08/997,545

[22] Filed: Dec. 23, 1997

[51] Int. Cl.⁶ .......................... F16K 24/00; B60K 15/035
[52] U.S. Cl. .......................... 137/588; 137/587; 141/312; 141/59
[58] Field of Search .................. 137/587, 588; 141/59, 329, 348, 312

[56] References Cited

U.S. PATENT DOCUMENTS

| | | |
|---|---|---|
| 3,187,936 | 6/1965 | Downing. |
| 3,330,439 | 7/1967 | Moorman. |
| 3,830,267 | 8/1974 | Cass ..................................... 141/312 X |
| 4,056,344 | 11/1977 | Lemelson. |
| 4,142,647 | 3/1979 | Walters ............................... 137/587 X |
| 4,394,925 | 7/1983 | Rump et al. ........................ 137/287 X |
| 4,610,284 | 9/1986 | Bartholomew ...................... 137/588 X |
| 4,722,454 | 2/1988 | Fischer ............................... 137/587 X |
| 4,724,861 | 2/1988 | Covert et al. ....................... 137/588 X |
| 4,730,652 | 3/1988 | Bartholomew ...................... 137/588 X |
| 4,887,652 | 12/1989 | Bucci ....................................... 141/59 |
| 4,960,153 | 10/1990 | Bergsma ................................. 137/587 |
| 5,027,868 | 7/1991 | Morris et al. ....................... 137/587 X |
| 5,186,875 | 2/1993 | Fukuhara. |
| 5,255,702 | 10/1993 | Journee et al. ..................... 137/588 X |
| 5,327,934 | 7/1994 | Thompson .............................. 137/588 |
| 5,375,633 | 12/1994 | Bucci .................................. 137/587 X |
| 5,538,039 | 7/1996 | Harde et al. .......................... 141/59 X |
| 5,598,870 | 2/1997 | Nagino .................................. 137/587 |
| 5,687,778 | 11/1997 | Harris ...................................... 141/59 |

FOREIGN PATENT DOCUMENTS

| | | |
|---|---|---|
| 0223931 | 6/1987 | European Pat. Off. . |
| 0245613 | 11/1987 | European Pat. Off. . |
| 0311756 | 4/1989 | European Pat. Off. . |
| 0515735 | 5/1991 | European Pat. Off. . |
| 0636505 | 12/1997 | European Pat. Off. . |
| 8630617 | 4/1987 | Germany . |
| 4032869 | 4/1992 | Germany . |
| 4111529 | 9/1992 | Germany . |
| 4140587 | 5/1992 | Japan . |
| 2249880 | 3/1992 | United Kingdom . |

OTHER PUBLICATIONS

Kunststoffe, vol. 83, No. 3, Mar. 1993, Munich, Germany, pp. 182–185, Fischer "Mehrschichtige Kunstoffrohre fur Kraftstoffleitungen".

*Primary Examiner*—John Rivell
*Assistant Examiner*—Meredith H. Schoenfeld
*Attorney, Agent, or Firm*—Sughrue, Mion, Zinn, Macpeak & Seas, PLLC

[57] ABSTRACT

A filler pipe unit for the fuel tank of a motor vehicle includes a substantially rigid fuel inlet pipe having a first end connectable to the vehicle body and a second end for connection to the fuel tank. A vent pipe connected to the fuel inlet pipe between the said first and second ends and also intended to be connected to the fuel tank is formed integrally with the fuel inlet pipe. The unit includes a tank for collecting fuel vapors disposed close to the first end of the fuel inlet pipe and formed integrally therewith.

13 Claims, 4 Drawing Sheets

FILLER PIPE UNIT FOR THE FUEL TANK OF A MOTOR VEHICLE

BACKGROUND OF THE INVENTION

The present invention relates generally to fuel supply systems for motor vehicles.

More specifically, the invention concerns a filler pipe unit for the fuel tank of a motor vehicle, including a substantially rigid fuel inlet pipe having a first end attachable to the motor vehicle body and a second end for connection to the fuel tank, and a vent pipe integral with the fuel inlet pipe and joined thereto between the said first and second ends, and intended also to be connected to the fuel tank.

Known filler pipe units of the kind described above have the advantage that they facilitate the operations for installation in a motor vehicle as they are relatively rigid and require few fixing elements to hold them in position to define a predetermined path within the vehicle body. In accordance with regulations which limit maximum emissions of hydrocarbon gases into the environment, a chamber for collecting the fuel vapours is associated with these known units, which typically functions as an expansion vessel and an accumulator for the vapours. This chamber, which is manufactured separately from the filler pipe unit, must however be attached to the motor vehicle and this necessitates the definition of a zone within the motor vehicle for its anchorage together with associated connection elements, the presence of which means that installation of the fuel supply system takes longer and is generally more labourious.

SUMMARY OF THE INVENTION

In order to overcome this disadvantage, the object of the invention is to provide a unit of the kind defined above, characterised in that it includes a chamber for collecting the fuel vapours located close to the first end of the fuel inlet pipe, and manufactured integrally therewith.

By virtue of these characteristics, the filler pipe unit enables a reduction in the number of components of the fuel supply system, which is advantageous in improving the overall sealing of the system and therefore reducing the emission of vapours into the environment, and which makes installation in the vehicle considerably faster and easier. In addition, it enables the optimum use of the material used to make the filler pipe unit, with a consequent reduction in production costs.

BRIEF DESCRIPTION OF THE DRAWINGS

Further characteristics and advantages of the present invention will become clearer from the following detailed description, given purely by way of non-limitative example and with reference to the accompanying drawings which illustrate a preferred embodiment, in which.

DETAILED DESCRIPTION OF THE INVENTION

Figure 1:
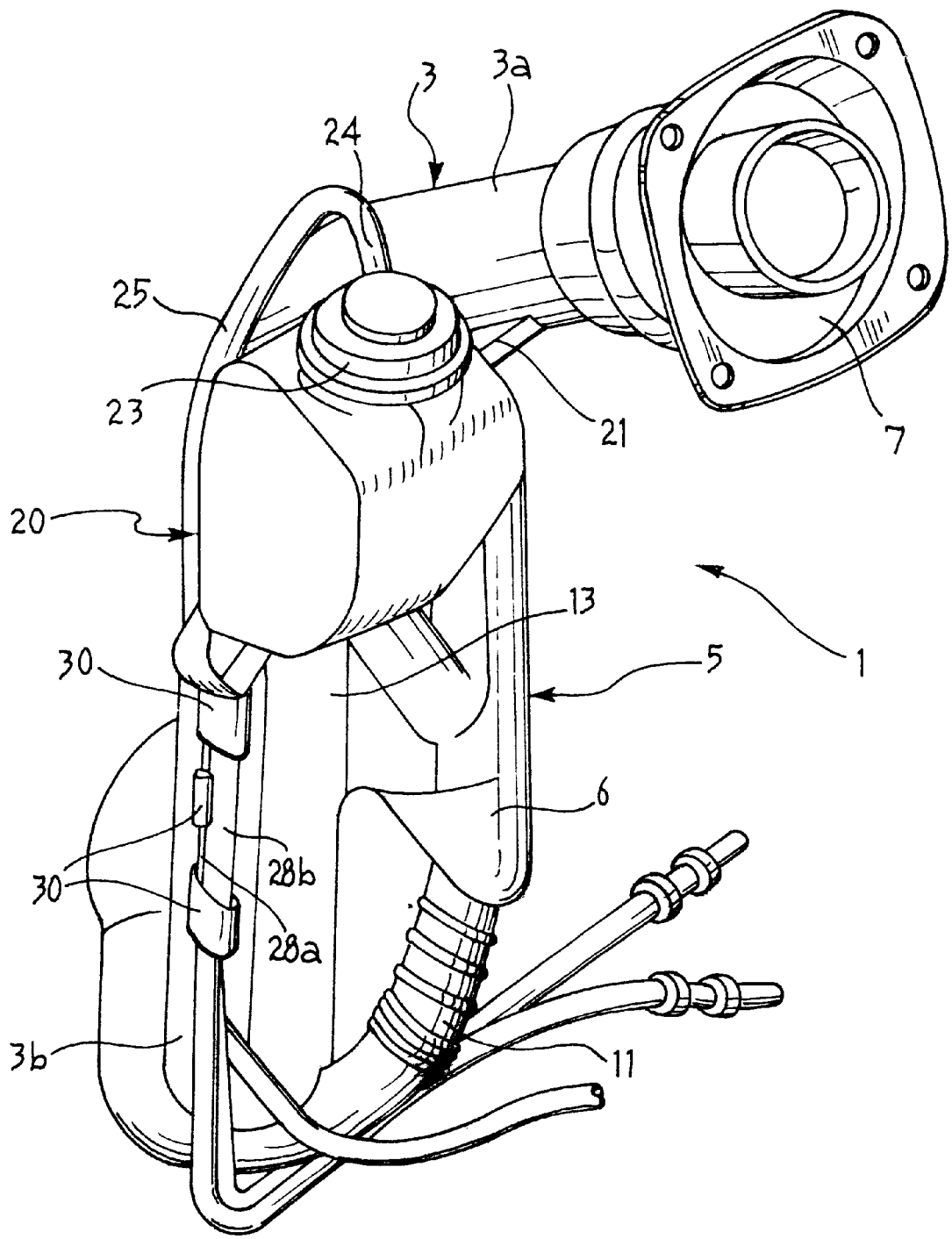
FIG. 1 is a perspective view of the filler pipe unit according to the invention.
Figure 2:
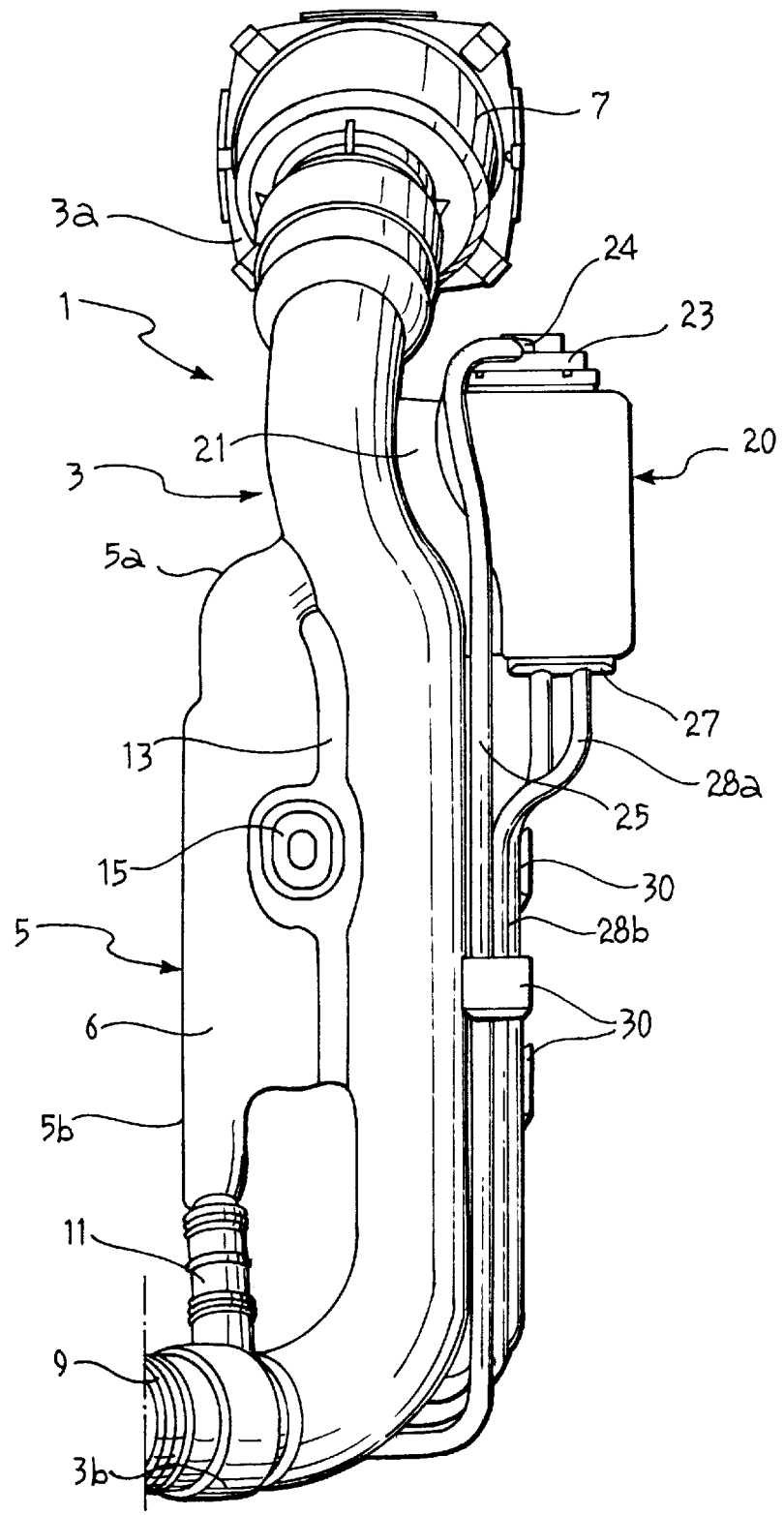
FIGS. 2 and 3 are different views of the unit of FIG. 1.
Figure 3:
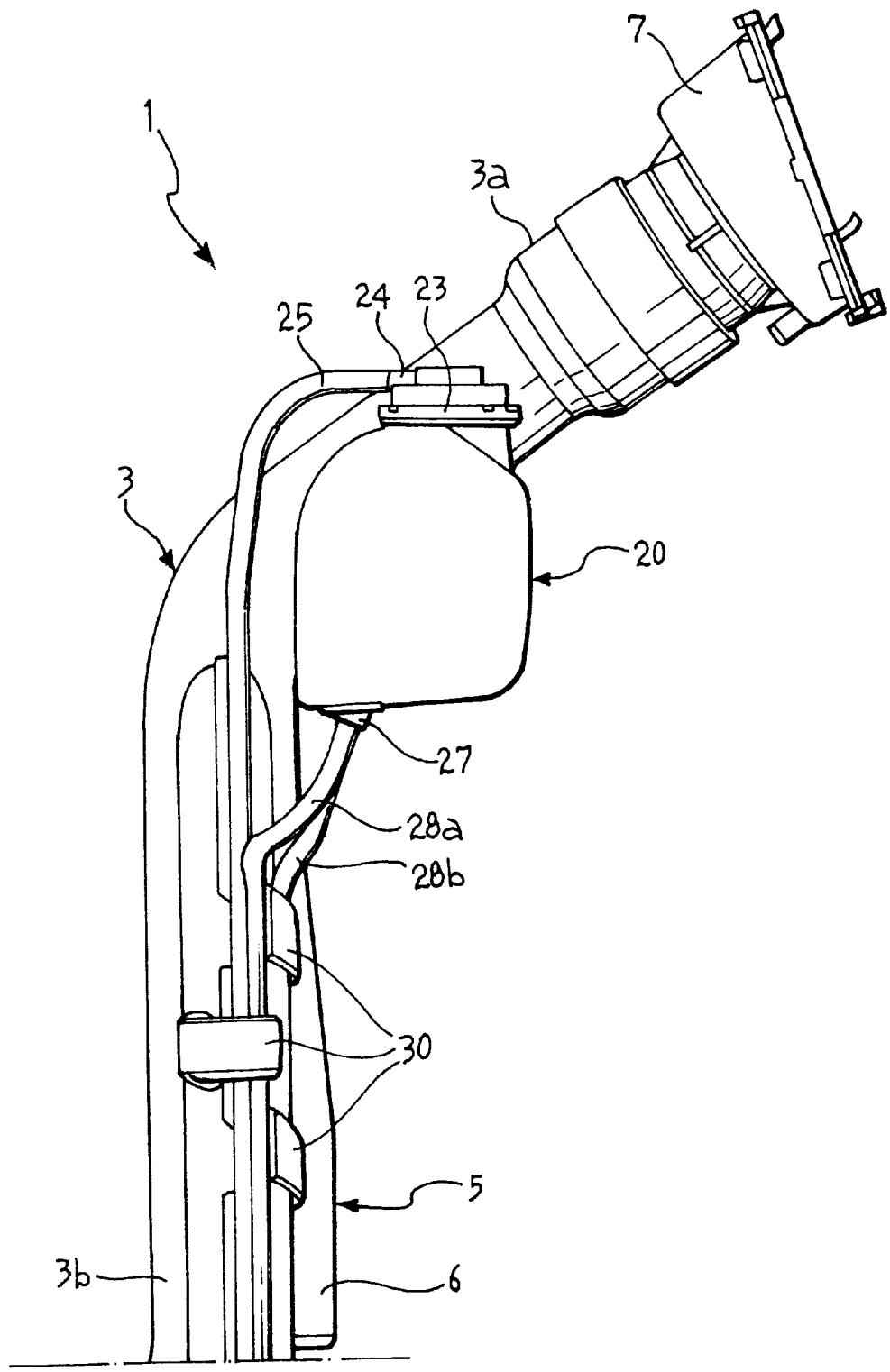

With reference to the drawings, the reference numeral 1 generally indicates a filler pipe unit for a vehicle, particularly a motor vehicle, which includes a tubular pipe 3 for the introduction of the fuel, and a tubular vent pipe 5 of generally smaller section than the pipe 3. The unit 1 is formed as a single, substantially rigid piece, preferably from a polyamide-based plastics material so as to give the best seal against hydrocarbons and their vapours. Furthermore, the use of such a material makes it particularly suitable to be formed by a blow moulding process.

The pipe 3 has a first end 3a to which a connector 7 is joined, for example, by moulding an external connector ring over the end 3a, which connector is provided with a flange intended to be connected to the vehicle body in correspondence with an aperture formed therein, and an opposite end 3b for connection to the fuel tank.

The pipes 3 and 5 are disposed side by side and the pipe 5 is connected to the pipe 3 along the generally intermediate portion between the ends 3a, 3b. A structural reinforcing rib 13 is defined between the pipes 3 and 5, starting from this connection portion, which rib is integral with the pipes 3 and 5 and extends towards the end 3b. A projection 15 for fixing the filler pipe unit 1 is advantageously formed integrally on the rib 13. The fuel inlet pipe 3 preferably has an integral, readily flexible bellows portion 9 disposed close to the end 3b to facilitate the connection to the fuel tank, and the vent pipe 5 is provided with an integral expansion chamber 6 close to its end 5b, opposite the end 5a for connection to the pipe 3, which functions to prevent blow back when the fuel is introduced into the pipe 3. Alternatively, the bellows portion 9 and/or the expansion chamber 6 may be formed separately from the pipes 3, 5 and connected subsequently thereto in any known way.

A tank 20 for collecting the fuel vapours and which acts as an expansion chamber therefor, formed together with the pipe 3, is located close to the first end 3a of the fuel inlet pipe 3. The tank 20 is supported by another rib 21 functioning as a bracket which extends from the part of the pipe 3 substantially opposite the vent pipe 5, generally at a curved portion of the pipe 3.

The top of the tank 20 is provided with an automatic pressure relief valve 23 of known, multifunctional type connected, for example, by a bayonet connection and usually of the type which opens when associated predetermined pressure difference thresholds between the environments upstream and downstream of the valve 23 are exceeded, and which closes when the motor vehicle tilts beyond a predetermined angle.

The valve 23 has a connector spigot 24 with a service tube 25 which enables the vapours collected therein to escape under certain conditions.

More specifically, filler pipe units 1 for installation in motor vehicles which use lead-free petrol or gasoline (a mixture of lead-free petrol and alcohol) as fuel, are connected to an anti-evaporation installation of known type which includes an activated carbon trap, also known as a "carbon canister", connected to an intake manifold of the engine, such that the vapours in the tank 20 can be retained in the activated carbon trap for release to the engine on demand, together with air from the external environment. In this case, the tank 20 is isolated from the fuel inlet pipe 3 and is provided at its base with a connector 27 for the connection of one or more service tubes 28a, 28b (two such tubes are shown by way of example in the accompanying drawings) for connection with associated safety float valves (not shown) installed on the upper wall of the fuel tank.

Figure 4:
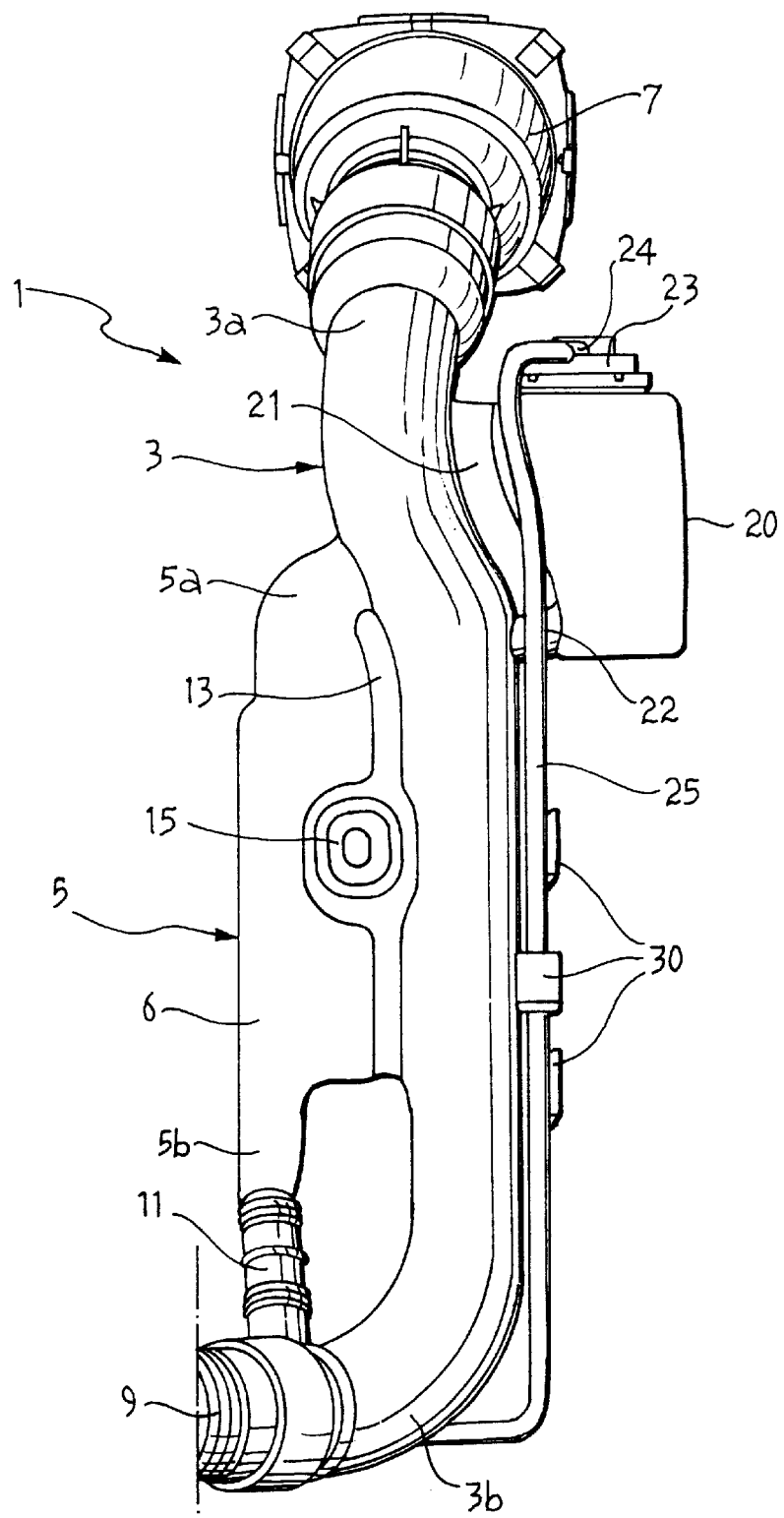
FIG. 4 is a view, similar to that of FIG. 2, of a different embodiment of the unit according to the invention.

In motor vehicles which use diesel, leaded petrol or alcohol as fuel, although an anti-evaporation installation is not envisaged as it is not required by safety regulations, the tank 20 still has the valve 23 with the associated tubing (see FIG. 4) which, in this case, communicates directly with the external environment. In this case too, the tank 20 also communicates with the pipe 3 by means of a connector pipe 22 which leads into the tank, close to the bottom thereof, and which is preferably formed along the support rib 21.

Resiliently deformable tongues 30 are advantageously integrally formed on the outside of the pipe 3 for holding the tube 25 and the tubes 28a, 28b, if present, against a portion of the pipe 3.

By virtue of the invention, it is particularly easy to install the filler pipe unit 1 in the associated motor vehicle in that, together with the associated tank 20, it is a single, substantially rigid element and therefore requires only a few connection elements to hold it in the correct position to define a predetermined path within the vehicle body. Since the unit is substantially rigid, the bellows portion 9 facilitates its connection with the fuel tank inlet, especially when both the fuel tank and the whole unit 1 are already installed in their respective final positions. This bellows portion is highly deformable which also enables it to absorb dimensional variations in the elements connected to it which may arise when the motor vehicle is in use due mainly to thermal stresses, and to damp vibrations arising when the motor vehicle is in use.

During the manufacture of the filler pipe unit of the invention, a preliminary tubular body, or "parison", is initially extruded, formed from polyamide-based plastics material and possibly containing a small percentage of elastomeric material in order to make the following stage of blow moulding the parison easier.

The parison is then disposed in a hollow open mould shaped to define the outer surfaces of the adjacent pipes 3 and 5 with the connection rib 13, and the tank 20 with the associated rib 21 for connection to the pipe 3. Since the tank 20 is disposed at the upper part of the pipe 3 close to the end 3a and at the opposite end to the vent pipe 5, and since the pipe 5 is either absent or of relatively small section in this zone, the tank 20 is advantageously formed by using the material of the parison which is in excess because the diameter of the pipe 5 is small or it is absent. In this way, and by virtue of the presence of the tank 20, the use of the parison material in the zone of the unit 1, close to the end 3a of the pipe 3, is optimised, thereby avoiding wastage of material.

Naturally, the mould is formed so as to be able to form the expansion chamber 6, the bellows portion 9, the attachment projection 15 and the resilient tongues 30 for retaining the service tubing, whenever these elements are to be manufactured integrally with the unit 1.

What is claimed is:

1. A filler pipe unit for a fuel tank of a motor vehicle, including a substantially rigid fuel inlet pipe having a first end connectable to the body of the motor vehicle and a second end for connection to the fuel tank, and a vent pipe integral with the fuel inlet pipe, connected thereto between said first and second ends and intended also to be connected to the fuel tank, wherein the filler pipe unit includes a tank for collecting fuel vapour disposed close to the first end of the fuel inlet pipe and formed integrally therewith.

2. A unit according to claim 1, wherein the vapour collection tank is formed on the fuel inlet pipe on a part opposite the vent pipe.

3. A unit according to claim 1, wherein the vapour collection tank is provided with an automatic, multifunctional relief valve.

4. A unit according to claim 3, wherein the vapour collection tank is isolated from the fuel inlet pipe.

5. A unit according to claim 4, wherein the vapour collection tank is connected to associated service tubing through the automatic pressure relief valve, said tubing being adapted to be connected to at least one safety float valve disposed in the fuel tank and to an activated carbon trap.

6. A unit according to claim 3, wherein the vapour collection tank communicates with the fuel inlet pipe through a connector pipe.

7. A unit according to claim 6, wherein the vapour collection tank communicates to communicate with the external environment through the automatic pressure relief valve.

8. A unit according to claim 1, wherein the filler pipe unit is formed from polyamide-based plastics material.

9. A unit according to claim 1, wherein a reinforcing rib is formed between said pipes, and is integral therewith.

10. A unit according to claim 9, wherein said rib has an integral attachment element.

11. A unit according to claim 1, wherein the fuel inlet pipe is provided with an integral bellows portion close to its second end, for connection with the fuel tank.

12. A unit according to claim 1, wherein the vent pipe includes an integral expansion chamber.

13. A unit according to claim 1, wherein the fuel inlet pipe has integral retention means for holding together service piping associated with the vapour collection tank.

* * * * *